(12) United States Patent
Uzzeni

(10) Patent No.: US 12,262,780 B2
(45) Date of Patent: Apr. 1, 2025

(54) MULTI-PURPOSE SAFETY SHOE

(71) Applicant: U-POWER GROUP S.P.A., Paruzzaro (IT)

(72) Inventor: Pier Franco Uzzeni, Arona (IT)

(73) Assignee: U-POWER GROUP S.P.A., Paruzzaro (IT)

( * ) Notice: Subject to any disclaimer, the term of this patent is extended or adjusted under 35 U.S.C. 154(b) by 352 days.

(21) Appl. No.: 17/604,207

(22) PCT Filed: May 12, 2020

(86) PCT No.: PCT/IB2020/054460
§ 371 (c)(1),
(2) Date: Oct. 15, 2021

(87) PCT Pub. No.: WO2020/234690
PCT Pub. Date: Nov. 26, 2020

(65) Prior Publication Data
US 2022/0202133 A1 Jun. 30, 2022

(30) Foreign Application Priority Data

May 17, 2019 (IT) .......................... 102019000006942

(51) Int. Cl.
*A43B 13/18* (2006.01)
*A43B 23/08* (2006.01)

(52) U.S. Cl.
CPC ............ *A43B 13/18* (2013.01); *A43B 23/081* (2013.01)

(58) Field of Classification Search
None
See application file for complete search history.

(56) References Cited

U.S. PATENT DOCUMENTS 4,401,770 A * 8/1983 Hance ................... A01N 25/34
521/157
4,667,423 A   5/1987 Autry et al.
(Continued)

FOREIGN PATENT DOCUMENTS

CN                104106876 B        7/2015
WO        WO-2017072202 A1 *   5/2017    ............. A43B 13/04
(Continued)

OTHER PUBLICATIONS

Machine Translation of WO 2017072202 A1, provided via Espacenet Patent Translate on Nov. 14, 2023 (Year: 2023).*

(Continued)

*Primary Examiner* — Jocelyn Bravo
(74) *Attorney, Agent, or Firm* — Oblon, McClelland, Maier & Neustadt, L.L.P.

(57) ABSTRACT

A multi-purpose safety shoe, comprising an upper assembly provided, at the shoe toe, with a safety toe cap and a layered sole associated with the upper assembly. The layered sole comprises a lower layer adapted to come into contact with the ground, an intermediate layer associated with the upper assembly and the lower layer, respectively, and an upper layer. Below the upper layer and in the intermediate layer, exclusively at the rear zone of said multi-purpose safety shoe, is an antifatigue insert made of a material having a resilience greater than 25% and less than 35%. The intermediate layer is made of polyurethane having a resilience greater than 35% and less than 45%.

23 Claims, 5 Drawing Sheets

(56) References Cited

U.S. PATENT DOCUMENTS

| | | | | |
|---|---|---|---|---|
| 5,086,084 A | * | 2/1992 | Michaelson | C08J 9/0061 |
| | | | | 521/137 |
| 6,184,259 B1 | * | 2/2001 | Peretti | C08J 9/32 |
| | | | | 521/54 |
| 6,331,577 B1 | * | 12/2001 | Volkert | C08G 18/4825 |
| | | | | 521/137 |
| 2007/0179208 A1 | * | 8/2007 | Schutte | C08G 18/631 |
| | | | | 521/99 |
| 2008/0086909 A1 | * | 4/2008 | Raspini | A43B 7/145 |
| | | | | 36/44 |
| 2013/0167405 A1 | * | 7/2013 | Forsey | A43B 7/1464 |
| | | | | 12/142 R |
| 2018/0332926 A1 | * | 11/2018 | Kramer | A43B 21/32 |
| 2020/0107608 A1 | | 4/2020 | Uzzeni | |
| 2020/0170342 A1 | | 6/2020 | Uzzeni | |

FOREIGN PATENT DOCUMENTS

| | | |
|---|---|---|
| WO | WO 2018/207147 A1 | 11/2018 |
| WO | WO 2019/008453 A1 | 1/2019 |

OTHER PUBLICATIONS

International Search Report mailed on Sep. 10, 2020 in PCT/IB2020/054460 filed on May 12, 2020 (4 pages).

\* cited by examiner

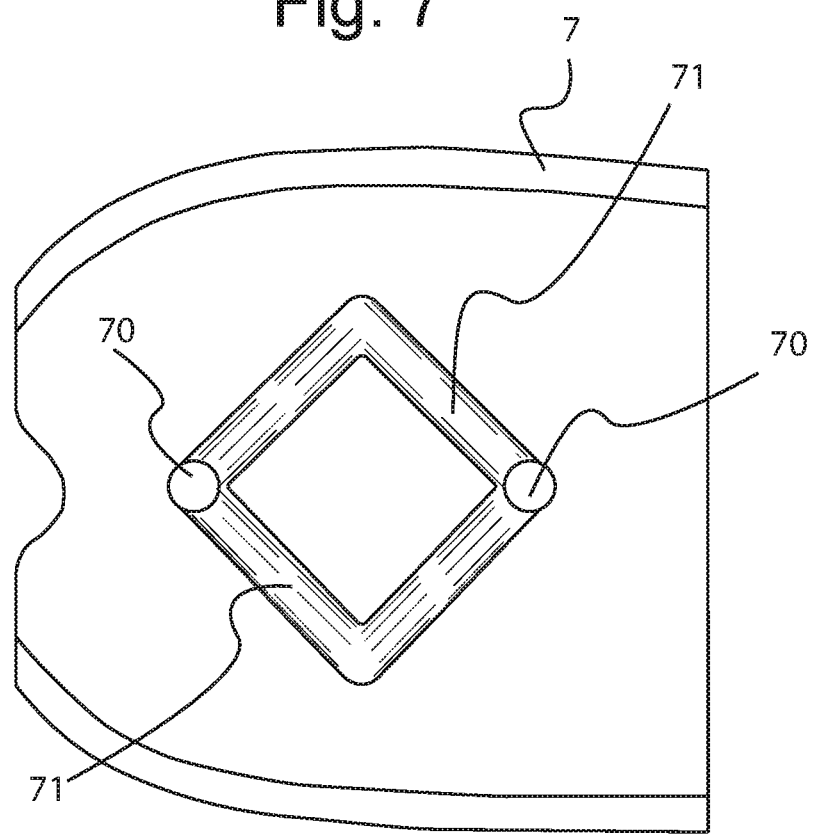

MULTI-PURPOSE SAFETY SHOE

CROSS-REFERENCE TO RELATED APPLICATIONS

The present application is the national stage of international application PCT/IB2020/054460, filed on May 12, 2020, and claims the benefit of the filing date of Italian Appl. No. 102019000006942, filed on May 17, 2019.

The present invention relates to a multi-purpose safety shoe.

Safety shoes are known from the state of the art, which are capable of providing the user with a desired degree of protection in case of accidental events.

As is known, professional work shoes are to comply with stringent standards, included among which are:

EN ISO 20345, relative to safety footwear with shoe toe resistance at 200 J;

EN ISO 20346, relative to safety footwear with shoe toe resistance at 100 J;

EN ISO 20344, relative to testing methods and general requirements.

In particular, in order to be defined as safety or accident-prevention shoes, work shoes are to be provided with a safety toe cap and therefore comply with Standards EN ISO 20344, EN ISO 20345 and EN ISO 20346.

Safety shoes therefore comprise an upper assembly provided, at the shoe toe, with a safety toe cap that is sufficiently structured, and therefore rigid, to resist knocks or crushing, thus protecting the user's foot.

In general, since these are work shoes, they are intended to be worn by the user continuously for several hours a day.

Safety shoes are currently known, which are provided with a layered sole comprising therein an insert made of an elastic material, for example of the expanded thermoplastic polyurethane type, which is adapted to make walking, and in general all activities in which the user is continuously moving, more comfortable thanks to the increased energy rebound and the soft and dynamic cushioning provided by the elastic insert itself.

However, many work activities for which it is required to wear safety shoes require frequently alternating between activities involving continuous movements of the operator from one place to another, and activities which instead are more sedentary, in which the operator is required to work in a standing position, stopped in a work station for prolonged periods of time.

As is known however, maintaining the standing position for prolonged periods of time involves stress and discomfort for the musculoskeletal apparatus.

It is a main task of the present invention to make a multi-purpose safety shoe that is capable of ensuring a high level of comfort for the user both during activities involving continuous movement and during sedentary activities.

Within the scope of this task, it is an object of the present invention to make a multi-purpose safety shoe that meets the requirements of any type of user.

It is another object again of the invention to make a multi-purpose safety shoe that is capable of providing the broadest guarantees in terms of reliability and safety in use, and that simultaneously is also easy and affordable to make when compared with the known technique.

The task disclosed above, and also the objects mentioned and others which are more apparent below, are achieved by a multi-purpose safety shoe as illustrated in claim 1.

Other features are provided in the dependent claims.

Further features and advantages shall be more apparent from the description of a preferred, but not exclusive, embodiment of a multi-purpose safety shoe, illustrated by mere way of non-limiting example with the aid of the accompanying drawings, in which:

FIG. 7 shows a top plan view of an antifatigue insert in the rear zone of the shoe of FIG. 1, according to the invention.

Figure 1:
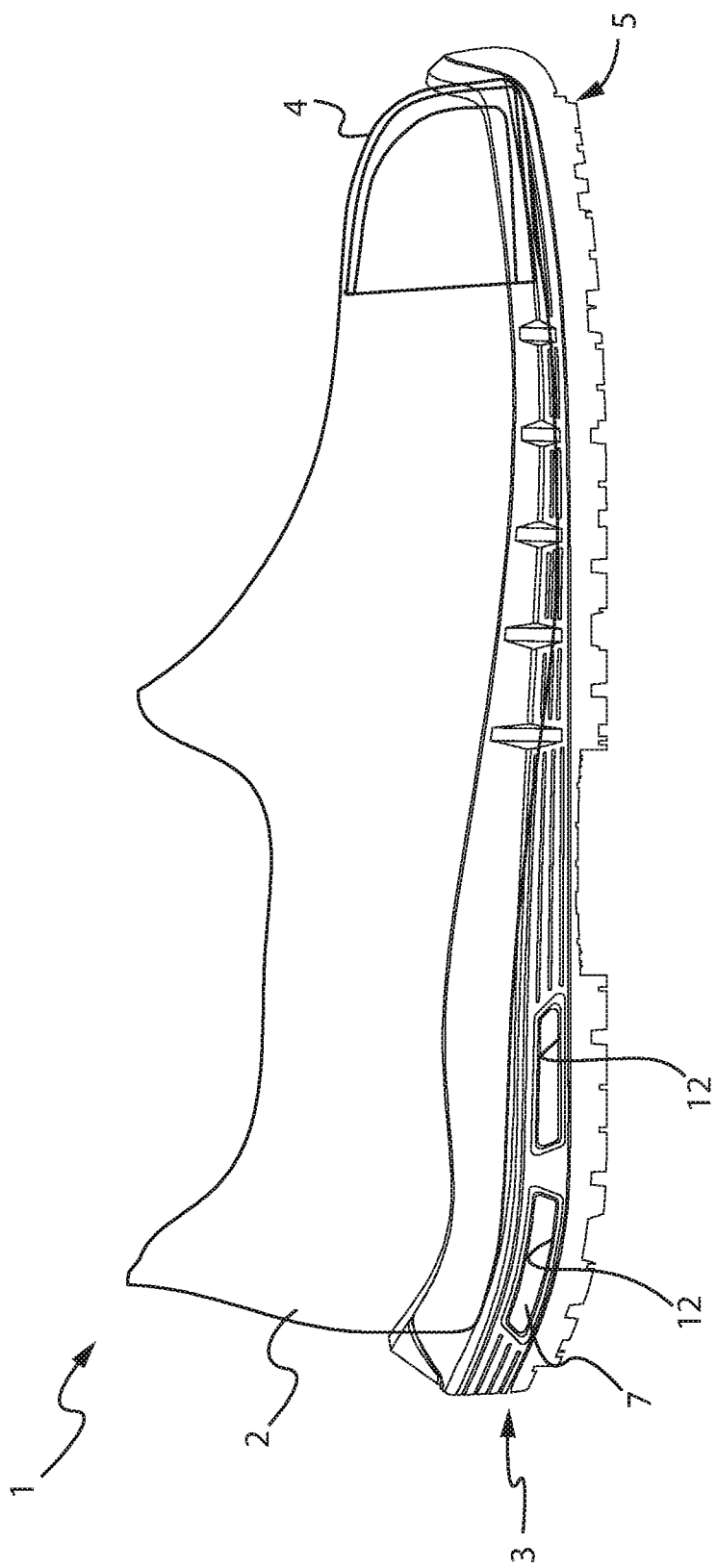
FIG. 1 is a lateral raised schematic assembly view of an embodiment of a multi-purpose safety shoe according to the invention.
Figure 2:
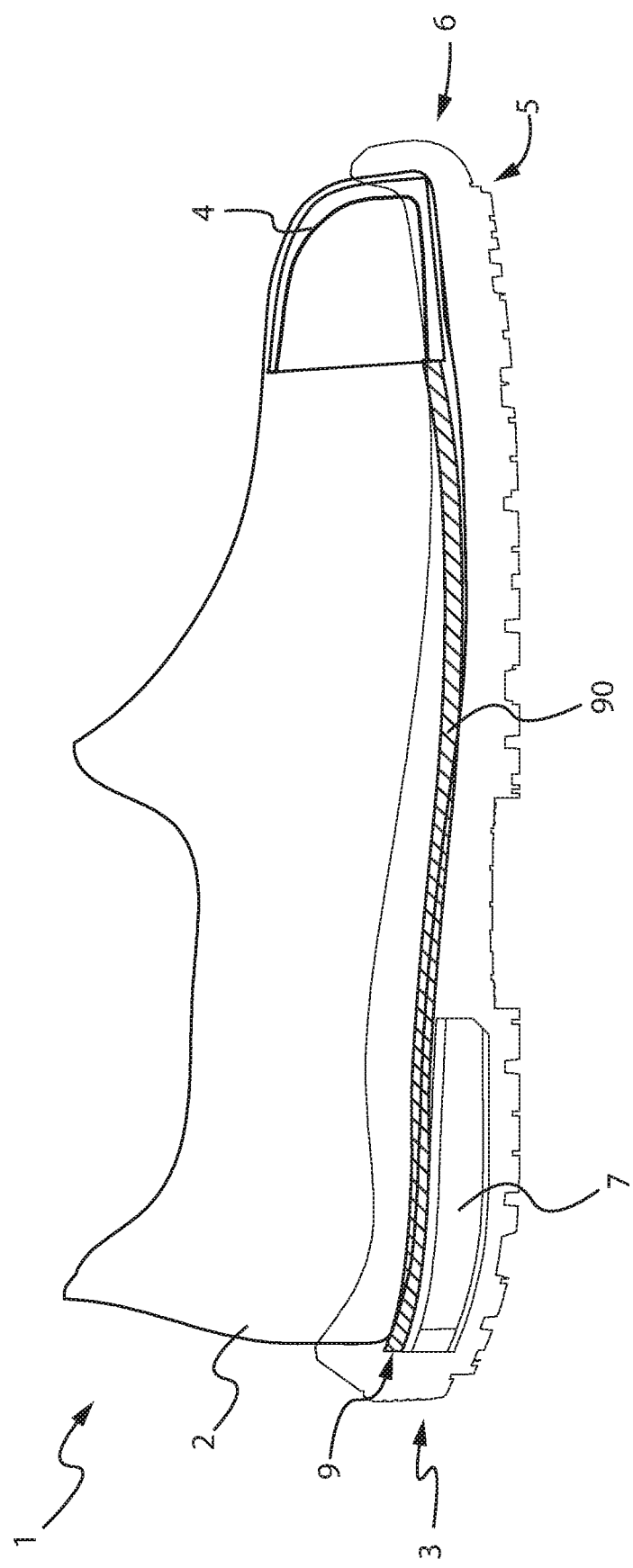
FIG. 2 is a different lateral raised schematic assembly view of the multi-purpose safety shoe of FIG. 1.

With reference to the mentioned drawings, the multi-purpose safety shoe, indicated as a whole with reference numeral 1, comprises an upper assembly 2 provided, at the shoe toe, with a safety toe cap 4, and a layered sole 3 associated with the upper assembly 2. Such layered sole 3 comprises a lower layer 5, i.e. tread, adapted to come into contact with the ground, an intermediate layer 6 associated with the upper assembly 2 and with the lower layer 5, respectively, and an upper layer 9.

According to the invention, there is, below the upper layer 9 and in the intermediate layer 6, exclusively at the rear zone of said multi-purpose safety shoe 1, i.e. at the heel, an antifatigue insert 7 made of a material having a resilience greater than 25% and less than 35%. Again according to the invention, the intermediate layer 6 is made of polyurethane having a resilience greater than 35% and less than 45%.

The aforesaid resilience values of the materials with which the antifatigue insert 7 and the intermediate layer 6 are made are measured according to the measurement standard DIN 53512 ("Determining the rebound resilience of rubber using the Schob pendulum") and depict the ratio between the rebound energy by an elastomer subjected to a knock and the energy applied to such elastomer during the knock itself.

The increased resilience value of the polyurethane with which the intermediate layer 6 is made therefore gives the multi-purpose safety shoe 1 good features of elastic rebound of the energy of the walk, thus reducing the fatigue of the user during activities involving movement. At the same time, the presence of the antifatigue insert 7 in the heel, which has a smaller resilience value, gives the multi-purpose safety shoe 1 also an increasingly comfortable behaviour in static situations in which the user remains in a standing position, stationary on the spot, for also prolonged periods of time, thanks to the static support effect provided by the antifatigue insert 7 at the user's heel, where the weight thereof is most discharged.

Preferably, the intermediate layer 6 is made of polyurethane having a resilience greater than 41%.

The fact that the antifatigue insert 7 is made of a material with resilience that is less than the resilience of the polyurethane with which the intermediate layer 6 of the layered sole 3 is made, and preferably about 5 percentage points less, provides the safety shoe 1 with an optimal compromise between an increased bearing capacity in static conditions, ensured by the antifatigue insert 7, and good elastic rebound of energy in dynamic conditions, ensured instead by the increased resilience of the polyurethane with which the intermediate layer 6 is made.

Advantageously, the intermediate layer 6 is made of polyurethane having a hardness between 30 and 45 Shore A.

Figure 3:
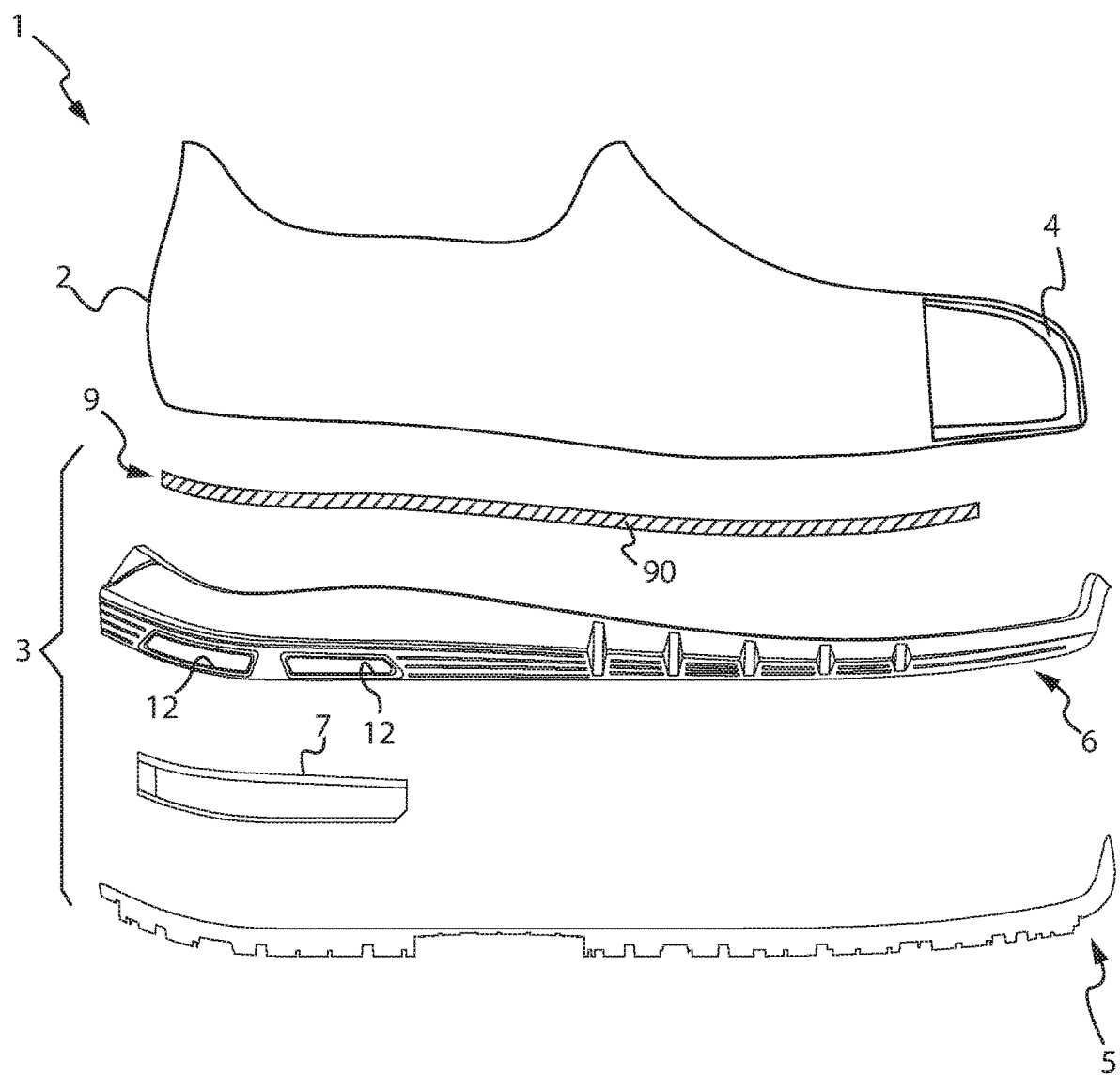
FIG. 3 is a lateral exploded view of the multi-purpose safety shoe of FIG. 1, according to the invention.
Figure 4:
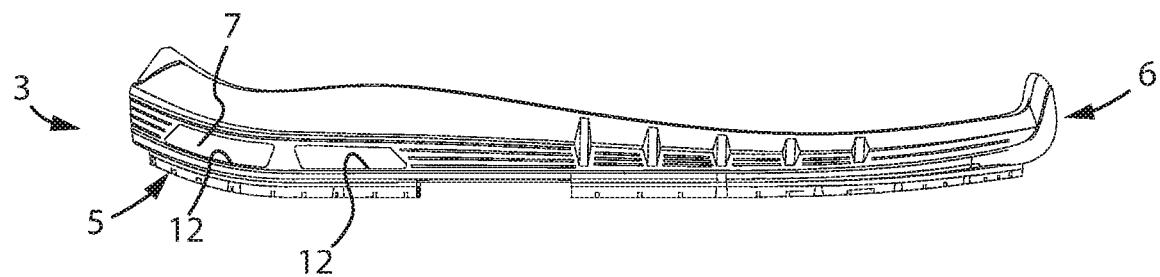
FIG. 4 is a lateral view of the peripheral part of the layered sole of the multi-purpose safety shoe of FIG. 1.
Figure 5:
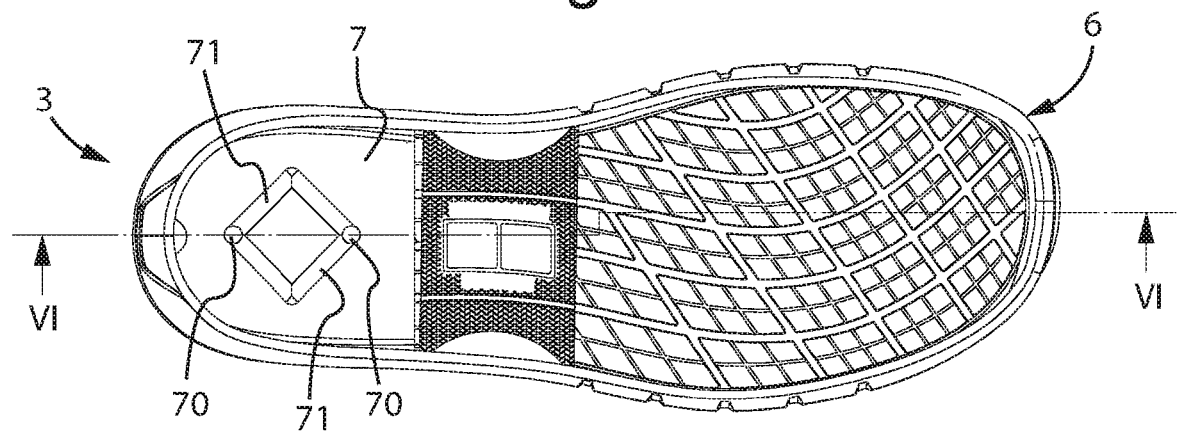
FIG. 5 is top plan view of the peripheral part of the layered sole of FIG. 4.
Figure 6:
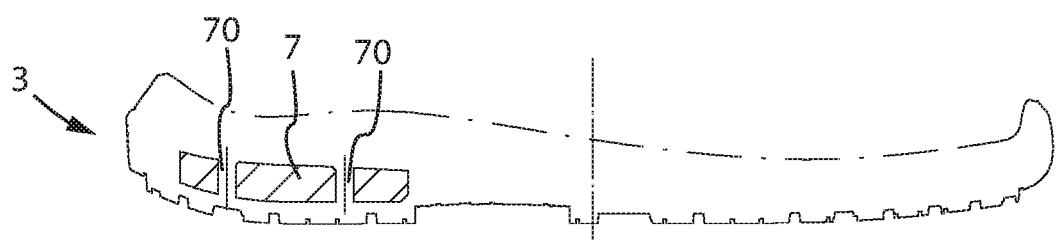
FIG. 6 is a partial sectional view of the peripheral part of the layered sole of FIG. 5, according to axis VI-VI.

As illustrated in particular in FIG. 3, the intermediate layer 6 of the layered sole 3 extends over the whole resting surface of the foot and, with the exception of the part involved by the antifatigue insert 7, is completely and exclusively made of said polyurethane having a resilience greater than 35% and less than 45%, preferably greater than 41%.

Moreover, the intermediate layer 6 advantageously is made of polyurethane having a moulding density less than 0.43 $g/cm^3$.

Preferably, the melding density of said polyurethane is between 0.37 and 0.41 $g/cm^3$ according to the environmental moulding conditions, in particular relative to the room temperature and room humidity level. Under optimal environmental conditions, the melding density of said polyurethane is equal to 0.39 $g/cm^3$.

The use of a polyurethane having a moulding density less than 0.43 $g/cm^3$ gives the layered sole 3, and therefore the shoe 1 as a whole, good lightweightness.

The greater resilience of 35% and the lesser moulding density of 0.43 $g/cm^3$ of the polyurethane with which the intermediate layer 6 of the layered sole 3 is made allow obtaining a lightweight and performing multi-purpose safety shoe 1 in terms of dynamic properties, and therefore a shoe that is easy and comfortable to wear and use for prolonged periods of time.

Advantageously, the polyurethane with which the intermediate layer 6 is made has a tensile strength, measured according to the measurement method DIN 53504, between 3.5 and 5 MPa, and/or an elongation at break, measured according to the measurement method DIN 53504, between 350 and 500%.

Advantageously, the antifatigue insert 7 comprises at least one polyol polymer.

Such polyol polymer preferably is a polyol polyester.

In an alternative embodiment, the polyol polymer may also be a polyol polyether.

Advantageously, the antifatigue insert 7 may be made of a bicomponent material comprising at least one polyol polymer, such as for example, a polyol polyester or a polyol polyether, and an isocyanate.

Preferably, the isocyanate is a diphenylmethane diisocyanate, and even more preferably a 4,4'-diphenylmethane diisocyanate.

The bicomponent material also comprises an amine catalyst.

Preferably, in particular when a polyol polyester is used, the amine catalyst is a tertiary aliphatic amine.

Advantageously, the bicomponent material comprises said polyester polyol polymer and said isocyanate in a ratio of 100:54 parts by weight, respectively.

In the alternative embodiment with polyol polyether, the bicomponent material comprises said polyether polyol polymer and said isocyanate in a ratio of 100:52 parts by weight, respectively.

Therefore, the antifatigue insert 7 advantageously is made of a polyurethane obtained from the polymerisation of a polyol, preferably polyester, with an isocyanate, which differs from the expanded thermoplastic polyurethanes used for the inserts made of elastic materials in the safety shoes of known type mentioned in the introduction, due to less resilience. Such lower resilience is also due to the absence of expanding agents which instead give increased resilience properties to the expanded thermoplastic polyurethanes. Therefore, the antifatigue insert 7 advantageously is made of an unexpanded polyurethane.

The material with which the antifatigue insert 7 is made advantageously has a density, measured according to the method ISO 845, between 0.3 and 0.36 $g/cm^3$, and preferably of about 0.35 $g/cm^3$.

Moreover, such material has a Shore A hardness, measured according to the method DIN 53 505, advantageously between 20 and 25, and preferably equal to 22 or 23.

Again, such material has a tensile strength, measured according to the method DIN 53 504, advantageously between 1.5 and 3.5 MPa, and preferably between 2.8 and 3.0 MPa.

Again, such material has an elongation at break, measured according to the method DIN 53 504, between 200 and 500%, and preferably greater than 400%.

Advantageously, if the antifatigue insert 7 is made with polyol polyester, the absolute compatibility is guaranteed with the polyurethane material with which the intermediate layer 6 of the layered sole 3 is made, where the antifatigue insert 7 is housed, and therefore the moulding and assembly procedures of the components making the layered sole 3 itself are particularly simplified.

Advantageously, the antifatigue insert 7 has thickness greater than 8 millimetres and less than 25 millimetres, preferably of about 12 millimetres.

Such minimum thickness of at least 8 millimetres of the antifatigue insert 7, combined with the materials with which such antifatigue insert 7 is made, and therefore combined with the resilience properties described, allow the multi-purpose safety shoe 1 to discharge the user's weight in static situations in an optimal manner.

Advantageously, the antifatigue insert 7 extends, at the rear zone of the multi-purpose safety shoe 1, substantially over a surface comprised between 20% and 55% of the total surface of the layered sole 3, and preferably comprised between 20% and 35%, and even more preferably about 27%.

Advantageously, the antifatigue insert 7 extends, at the rear zone of the multi-purpose safety shoe 1, for a length comprised between 20% and 60% of the overall length of the layered sole 3, and preferably comprised between 22% and 40%, and even more preferably about 30%.

Since in terms of width, the antifatigue insert 7 is slightly narrower than the intermediate layer 6, and since the front zone of the layered sole 3 is slightly wider and broader than the rear zone of the layered sole, the percentage length values of the antifatigue insert 7, such as the ones disclosed above, are slightly greater than the corresponding percentage values of surface extension of the antifatigue insert 7, such as the ones disclosed above.

In any case, the aforesaid sizes of the antifatigue insert 7 on the one hand, allow an adequate resting surface for the heel of the user's foot to be provided in order to discharge the user's weight in static conditions, and on the other, for the intermediate layer 6 made of more resilient polyurethane to adequately exert its rebound energy functions during dynamic activities.

Advantageously, the antifatigue insert 7 also comprises one or more through holes 70 that passes through the thickness of the antifatigue insert 7 itself. In this manner, the material with which the intermediate layer 6 is made may, during the moulding steps, flow and fill such through holes 70, thus ensuring a stable positioning of the antifatigue insert 7 in the layered sole 3.

Advantageously, the antifatigue insert 7 may also comprise one or more open channels 71 obtained on the upper and/or lower surfaces of the insert itself, in communication with said one or more through holes 70. In this manner, the material with which the intermediate layer 6 is made may, during the moulding steps, flow into and fill also such open channels 71, thus further promoting the antifatigue insert 7 to be retained in the intermediate layer 6.

As mentioned, the presence of the safety toe cap 4 allows the shoe 1 to meet the current safety standards, and in particular Standards EN ISO 20344 and EN ISO 20345, or also Standard EN ISO 20346.

The safety toe cap 4 may be provided with holes and comprise a protective membrane provided to close the aforesaid holes in order to simultaneously ensure the breathing and protection of the user's foot.

Advantageously, the lower layer 5 may be made of polyurethane having a moulding density that is greater than 0.90 g/cm$^3$.

The use of polyurethane also for the lower layer 5, in addition to the intermediate layer 6, allows facilitating the operations of making the layered sole 3 itself, thanks to the chemical/physical compatibility of the two materials.

Advantageously, the upper layer 9 may comprise, or consist of, an anti-perforation lamina 90.

Preferably, the anti-perforation lamina 90 is in direct contact with the upper face of the antifatigue insert 7.

An inventive multi-purpose safety shoe 1 may comprise an intermediate layer 6 comprising a plurality of windows 12 distributed along the lateral surfaces of the intermediate layer 6 at the rear zone of such a multi-purpose safety shoe 1. The antifatigue insert 7 may expose lateral surfaces thereof through such windows 12.

It has in practice been established that the multi-purpose safety shoe according to the present invention absolves the task and also the pre-set objects because it is comfortable to wear and use, both during dynamic and static activities.

Another advantage of the multi-purpose safety shoe according to the invention consists in the fact of being equally comfortable both during prolonged periods of dynamic activity and during prolonged periods of stationary activity of the user.

Another advantage of the multi-purpose safety shoe according to the invention consists in the fact of ensuring the user is provided with a significant energy rebound during walking albeit while having a less resilient insert in the heel, and therefore also capable overall of supporting and discharging the weight of the user during stationary activities.

The multi-purpose safety shoe thus conceived is susceptible to many modifications and variants, all falling within the same inventive concept; furthermore, all details can be replaced by equivalent technical elements. In practice, the materials used, as well as their dimensions, can be of any type according to the technical requirements.

In practice, the materials used, provided they are compatible with the specific use, as well as the contingent dimensions and shapes, may be of any type depending on the needs.

The invention claimed is:

1. A multi-purpose safety shoe, comprising:
an upper assembly having a shoe toe with a safety toe cap; and
a layered sole associated with the upper assembly, wherein the layered sole comprises:
a lower layer adapted to come into contact with the ground;
an intermediate layer associated with the upper assembly and the lower layer, respectively;
an upper layer; and
an anti-fatigue insert, wherein the anti-fatigue insert is below the upper layer and in the intermediate layer, exclusively at a rear zone of the multi-purpose safety shoe,
wherein the anti-fatigue insert is made of a material having a resilience greater than 25% and less than 35% measured according to the measurement standard DIN 53512,
wherein the intermediate layer of the layered sole is configured to extend over a whole resting surface of a foot, wherein, excepting a volume occupied by the anti-fatigue insert, the intermediate layer consists of polyurethane having a resilience greater than 35% and less than 45% measured according to the measurement standard DIN 53512, and
wherein the upper layer comprises an anti-perforation lamina and directly contacts both the intermediate layer and the anti-fatigue insert without covering the entire intermediate layer.

2. The shoe of claim 1, wherein the polyurethane of the intermediate layer has a resilience greater than 41% and less than 45%.

3. The shoe of claim 1, wherein the anti-fatigue insert comprises a polyol polymer.

4. The shoe of claim 1, wherein the intermediate layer comprises a polyurethane having a molding density of less than 0.43 g/cm$^3$.

5. The shoe of claim 1, wherein the anti-fatigue insert has a thickness of at least 8 mm.

6. The shoe of claim 1, wherein the anti-fatigue insert is made of a bicomponent material comprising a polyol polymer and an isocyanate.

7. The shoe of claim 1, wherein the upper layer consists of the anti-perforation lamina.

8. The shoe of claim 7, wherein the anti-perforation lamina is in direct contact with an upper face of the anti-fatigue insert.

9. The shoe of claim 1, wherein the intermediate layer comprises a plurality of windows distributed along lateral surfaces of the intermediate layer at the rear zone of the multi-purpose safety shoe, and
wherein lateral surfaces of the anti-fatigue insert are exposed through the windows.

10. The shoe of claim 1, wherein the anti-fatigue insert extends, at the rear zone of the multi-purpose safety shoe, substantially over a surface in a range of from 20 to 55% of a total surface of the layered sole.

11. The shoe of claim 1, wherein the anti-fatigue insert extends, at the rear zone of the multi-purpose safety shoe, for a length in a range of from 20 to 60% of the overall length of the layered sole.

12. The shoe of claim 1, wherein the anti-fatigue insert comprises a through hole which passes through the thickness of the anti-fatigue insert.

13. The shoe of claim 1, wherein the anti-fatigue insert is made of material having a molding density in a range of from 0.3 to 0.36 g/cm$^3$.

14. The shoe of claim 1, wherein the resilience of the material of which the anti-fatigue insert is made, measured according to the measurement standard DIN 53512, is less than the resilience of the polyurethane of which the intermediate layer is made, measured according to the measurement standard DIN 53512.

15. The shoe of claim 1, wherein the anti-fatigue insert is made of unexpanded polyurethane.

16. The shoe of claim 1, wherein the anti-fatigue insert comprises a polyester polyol polymer and an isocyanate.

17. The shoe of claim 1, wherein the anti-fatigue insert comprises more than one polyol polymer.

18. The shoe of claim 1, wherein the anti-fatigue insert extends, at the rear zone of the multi-purpose safety shoe 1, over a surface in a range of from 20 to 33% of a total surface of the layered sole, and wherein the toe cap meets 2019 safety standards under (i) EN ISO 20344 and EN ISO 20345, and/or (ii) Standard EN ISO 20346.

19. A multi-purpose safety shoe, comprising:
an upper assembly having a shoe toe with a safety toe cap; and
a layered sole associated with the upper assembly,
wherein the layered sole comprises:
a lower layer adapted to come into contact with the ground;
an intermediate layer associated with the upper assembly and the lower layer, respectively;
an upper layer; and
an anti-fatigue insert,
wherein the anti-fatigue insert is below the upper layer and in the intermediate layer, exclusively at a rear zone of the multi-purpose safety shoe,
wherein the anti-fatigue insert is made of a material having a resilience greater than 25% and less than 35% measured according to the measurement standard DIN 53512,
wherein the intermediate layer of the layered sole is configured to extend over a whole resting surface of a foot,
wherein, excepting a volume occupied by the anti-fatigue insert, the intermediate layer consists of polyurethane having a resilience greater than 35% and less than 45% measured according to the measurement standard DIN 53512,
wherein the anti-fatigue insert has a thickness greater than 8 mm and less than 25 mm, and
wherein the anti-fatigue insert comprises a first volume and a second volume, separated from the first volume, and a channel between the first and second volume.

20. A multi-purpose safety shoe, comprising:
an upper assembly having a shoe toe with a safety toe cap; and
a layered sole associated with the upper assembly,
wherein the layered sole comprises:
a lower layer adapted to come into contact with the ground;
an intermediate layer associated with the upper assembly and the lower layer, respectively;
an upper layer; and
an anti-fatigue insert,
wherein the anti-fatigue insert is below the upper layer and in the intermediate layer, exclusively at a rear zone of the multi-purpose safety shoe,
wherein the anti-fatigue insert is made of a material having a resilience greater than 25% and less than 35% measured according to the measurement standard DIN 53512,
wherein, excepting a volume occupied by the anti-fatigue insert, the intermediate layer consists of polyurethane having a resilience greater than 35% and less than 45% measured according to the measurement standard DIN 53512,
wherein the upper layer consists of an anti-perforation lamina,
wherein the anti-perforation lamina is in direct contact with an upper face of the anti-fatigue insert,
wherein the intermediate layer comprises a plurality of windows distributed along lateral surfaces of the intermediate layer at the rear zone of the multi-purpose safety shoe,
wherein the windows of the intermediate layer expose lateral surfaces of the anti-fatigue insert, and
wherein the safety toe cap comprises holes and a protective membrane provided to close the holes in order to simultaneously ensure breathing and protection of a user's foot.

21. The shoe of claim 20, wherein the anti-fatigue insert has a thickness greater than 8 mm and less than 25 mm.

22. The shoe of claim 20, wherein the upper layer directly contacts both the intermediate layer and the anti-fatigue insert without covering the entire intermediate layer.

23. The shoe of claim 20, wherein the anti-fatigue insert has a thickness greater than 8 mm and less than 25 mm, and
wherein the anti-fatigue insert comprises a first volume and a second volume, separated from the first volume, and a channel between the first and second volume.

* * * * *